United States Patent
Kodama et al.

(10) Patent No.: US 10,449,730 B2
(45) Date of Patent: Oct. 22, 2019

(54) ELECTRONIC DEVICE MANUFACTURING DEVICE AND MANUFACTURING METHOD THEREOF

(75) Inventors: Seigo Kodama, Ama-gun (JP); Kenji Tsukada, Toyota (JP); Masatoshi Fujita, Anjyo (JP)

(73) Assignee: FUJI CORPORATION, Chiryu-shi (JP)

( * ) Notice: Subject to any disclaimer, the term of this patent is extended or adjusted under 35 U.S.C. 154(b) by 408 days.

(21) Appl. No.: 14/426,905

(22) PCT Filed: Sep. 13, 2012

(86) PCT No.: PCT/JP2012/073539
§ 371 (c)(1),
(2), (4) Date: Mar. 9, 2015

(87) PCT Pub. No.: WO2014/041670
PCT Pub. Date: Mar. 20, 2014

(65) Prior Publication Data
US 2015/0224711 A1    Aug. 13, 2015

(51) Int. Cl.
*B33Y 10/00* (2015.01)
*B29C 67/00* (2017.01)
(Continued)

(52) U.S. Cl.
CPC ........ *B29C 67/0077* (2013.01); *B22F 3/1055* (2013.01); *B29C 64/00* (2017.08);
(Continued)

(58) Field of Classification Search
CPC ...................................... B33Y 10/00
See application file for complete search history.

(56) References Cited

U.S. PATENT DOCUMENTS 5,252,264 A    10/1993  Forderhase et al.
5,594,652 A    1/1997   Penn et al.
(Continued)

FOREIGN PATENT DOCUMENTS

JP    7 40445      2/1995
JP    7 501019     2/1995
(Continued)

OTHER PUBLICATIONS

Lappo. Discrete Multiple Material Selective Laser Sintering. Solid Freeform Symposium 2003. Retrieved from https://sffsymposium.engr.utexas.edu/Manuscripts/2003/2003-10-Lappo.pdf on Mar. 13, 2017.*

(Continued)

*Primary Examiner* — Matthew E. Hoban
(74) *Attorney, Agent, or Firm* — Oblon, McClelland, Maier & Neustadt, L.L.P.

(57) ABSTRACT

When manufacturing three-dimensional electronic device by layering multiple layer cross sections sliced at a predetermined thickness of three-dimensional electronic device which is the target for forming, first, each layer cross section using multiple types of materials is formed by being layered on top of the layer cross section underneath, and each time a layer cross section is formed, the cross section is cured or sintered by being exposed to ultraviolet light, a laser beam, visible light, and so on. The forming method for each cross section may be forming cross section by discharging a binder via a droplet discharge method such as inkjet printing or dispensing, or by spreading a layer of powdered material and bonding the powdered material by discharging a binder or sintering it by exposing it to a laser beam.

15 Claims, 4 Drawing Sheets

(51) Int. Cl.
 *B33Y 80/00* (2015.01)
 *B22F 3/105* (2006.01)
 *B29C 64/00* (2017.01)
 *B29C 64/153* (2017.01)
 *B33Y 30/00* (2015.01)
 *B29L 31/34* (2006.01)

(52) U.S. Cl.
 CPC ............ *B29C 64/153* (2017.08); *B33Y 80/00* (2014.12); *B29L 2031/34* (2013.01); *B33Y 10/00* (2014.12); *B33Y 30/00* (2014.12)

(56) References Cited

U.S. PATENT DOCUMENTS

| | | | |
|---|---|---|---|
| 6,596,224 B1 * | 7/2003 | Sachs | B22F 3/008 264/113 |
| 7,300,613 B2 * | 11/2007 | Sano | B29C 67/0081 264/113 |
| 2004/0141018 A1 | 7/2004 | Silverbrook | |
| 2004/0141024 A1 | 7/2004 | Silverbrook | |
| 2004/0141025 A1 | 7/2004 | Silverbrook | |
| 2004/0141030 A1 | 7/2004 | Silverbrook | |
| 2004/0141042 A1 | 7/2004 | Silverbrook | |
| 2004/0141043 A1 | 7/2004 | Silverbrook | |
| 2004/0143358 A1 | 7/2004 | Silverbrook | |
| 2004/0145618 A1 | 7/2004 | Silverbrook | |
| 2004/0145627 A1 | 7/2004 | Silverbrook | |
| 2004/0145628 A1 | 7/2004 | Silverbrook | |
| 2004/0145629 A1 | 7/2004 | Silverbrook | |
| 2004/0145781 A1 | 7/2004 | Silverbrook | |
| 2004/0148040 A1 | 7/2004 | Silverbrook | |
| 2004/0225398 A1 | 11/2004 | Silverbrook | |
| 2005/0015175 A1 | 1/2005 | Huang | |
| 2005/0278056 A1 | 12/2005 | Farnworth et al. | |
| 2006/0030964 A1 | 2/2006 | Silverbrook | |
| 2006/0040489 A1 * | 2/2006 | Shintate | H05K 3/4664 438/618 |
| 2006/0077241 A1 | 4/2006 | Silverbrook | |
| 2006/0268044 A1 | 11/2006 | Silverbrook | |
| 2006/0268057 A1 | 11/2006 | Silverbrook | |
| 2007/0013737 A1 | 1/2007 | Silverbrook | |
| 2007/0030326 A1 | 2/2007 | Silverbrook | |
| 2007/0052752 A1 | 3/2007 | Silverbrook | |
| 2007/0123058 A1 | 5/2007 | Farnworth et al. | |
| 2007/0124012 A1 | 5/2007 | Farnworth et al. | |
| 2007/0128855 A1 * | 6/2007 | Cho | H05K 3/4664 438/637 |
| 2007/0150088 A1 | 6/2007 | Silverbrook | |
| 2007/0182782 A1 | 8/2007 | Silverbrook | |
| 2007/0182799 A1 | 8/2007 | Silverbrook | |
| 2007/0188549 A1 | 8/2007 | Silverbrook | |
| 2007/0195150 A1 | 8/2007 | Silverbrook | |
| 2007/0208448 A1 | 9/2007 | Silverbrook | |
| 2007/0252871 A1 | 11/2007 | Silverbrook | |
| 2008/0001997 A1 | 1/2008 | Silverbrook | |
| 2008/0062214 A1 | 3/2008 | Silverbrook | |
| 2008/0068416 A1 | 3/2008 | Silverbrook | |
| 2008/0084450 A1 | 4/2008 | Silverbrook | |
| 2008/0138515 A1 | 6/2008 | Williams | |
| 2008/0231645 A1 | 9/2008 | Silverbrook | |
| 2008/0269940 A1 | 10/2008 | Silverbrook | |
| 2009/0066775 A1 | 3/2009 | Silverbrook | |
| 2009/0076643 A1 | 3/2009 | Silverbrook | |
| 2009/0167797 A1 | 7/2009 | Silverbrook | |
| 2009/0244238 A1 | 10/2009 | Silverbrook | |
| 2010/0002041 A1 | 1/2010 | Silverbrook | |
| 2010/0007696 A1 | 1/2010 | Silverbrook | |
| 2010/0118086 A1 | 5/2010 | Silverbrook | |
| 2010/0165046 A1 | 7/2010 | Silverbrook | |
| 2010/0165047 A1 | 7/2010 | Silverbrook | |
| 2010/0174399 A1 | 7/2010 | Silverbrook | |
| 2010/0200167 A1 | 8/2010 | Silverbrook | |
| 2010/0278952 A1 | 11/2010 | Silverbrook | |
| 2011/0190923 A1 * | 8/2011 | Matsui | G06F 19/00 700/118 |
| 2011/0298881 A1 | 12/2011 | Silverbrook | |
| 2011/0316931 A1 | 12/2011 | Silverbrook | |
| 2014/0345521 A1 | 11/2014 | Silverbrook | |

FOREIGN PATENT DOCUMENTS

| | | |
|---|---|---|
| JP | 11 274671 | 10/1999 |
| JP | 2008 98280 | 4/2008 |
| JP | 2010 512255 | 4/2010 |
| WO | WO 2004/062921 A1 | 7/2004 |

OTHER PUBLICATIONS

Brandt. Effect of different photo-initiators and light curing units on degree of conversion of composites. Braz Oral Res. Jul.-Sep. 2010;24(3):263-70.*

Extended European Search Report dated Mar. 15, 2016 in Patent Application 12884442.0.

International Search Report dated Oct. 9, 2012 in PCT/JP12/073539 Filed Sep. 13, 2012.

* cited by examiner

[Fig.1]
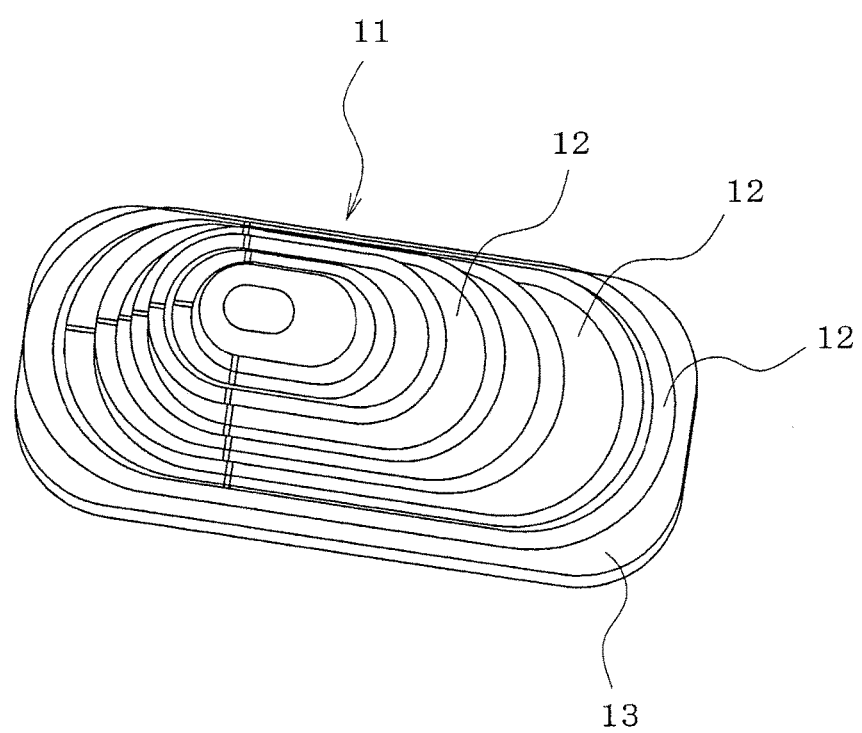

[Fig.2]
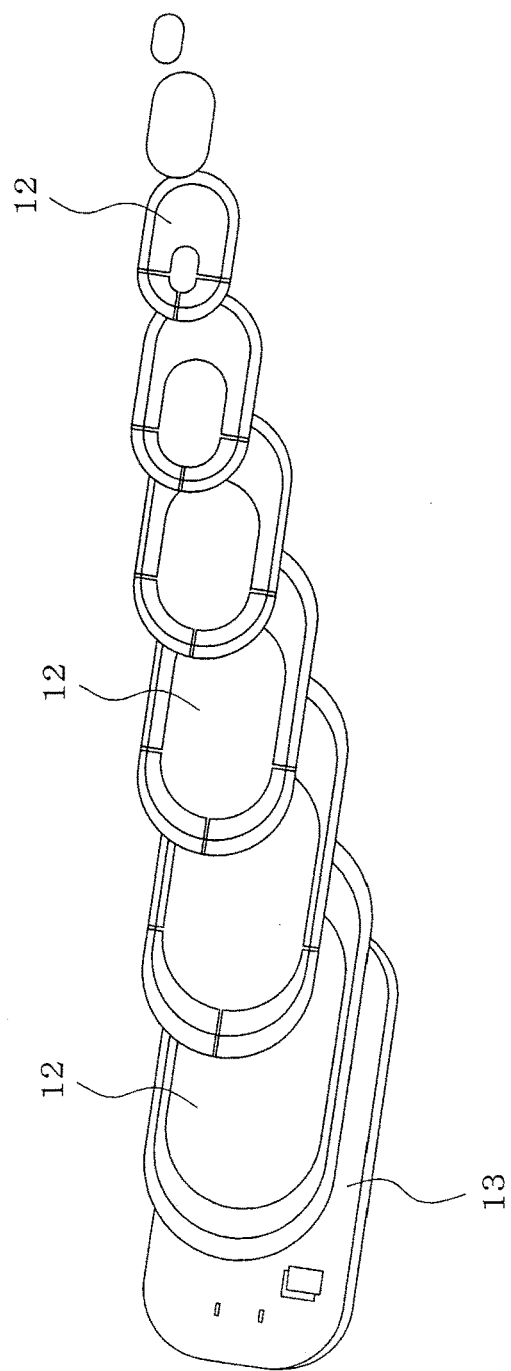

[Fig.3]
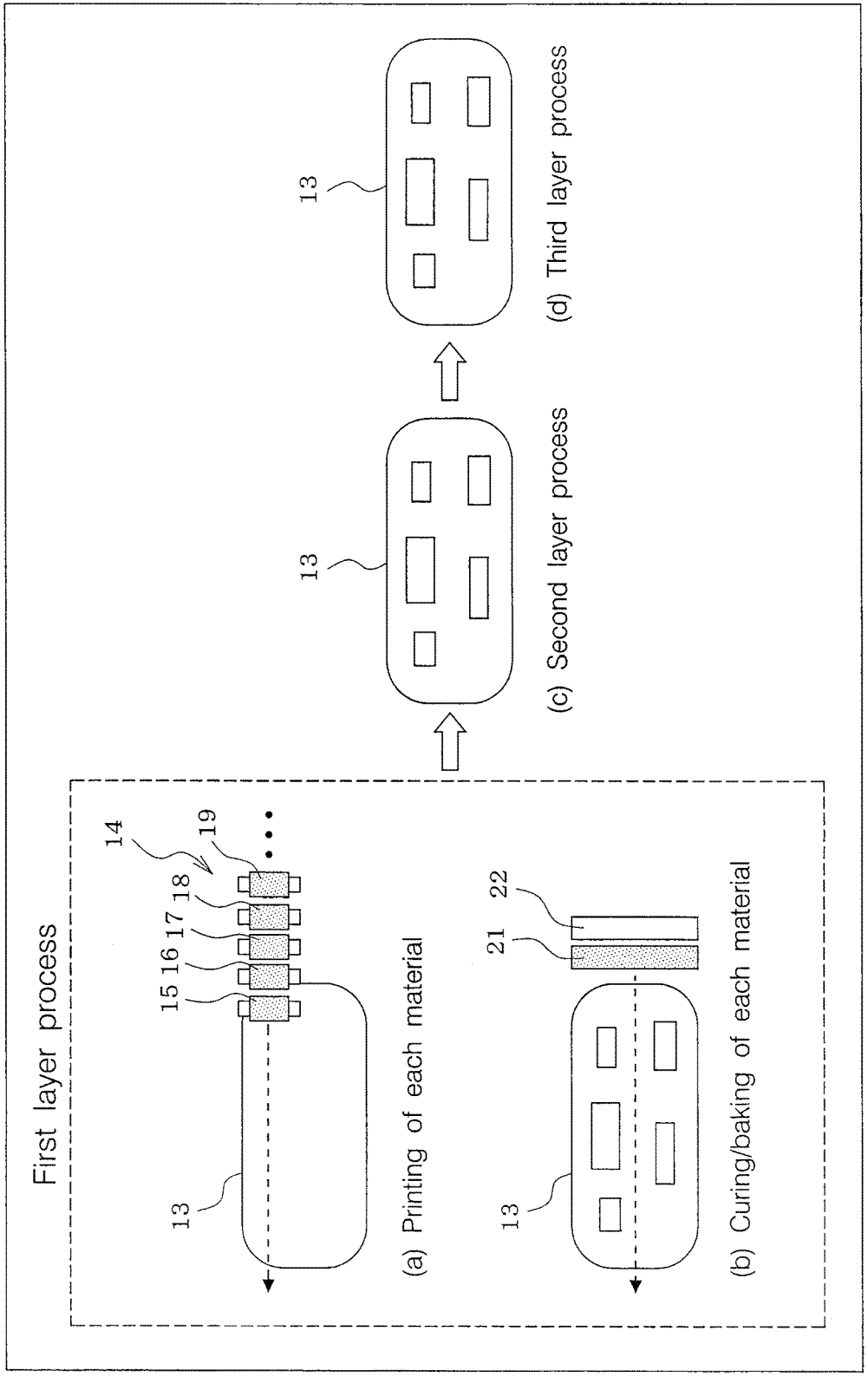

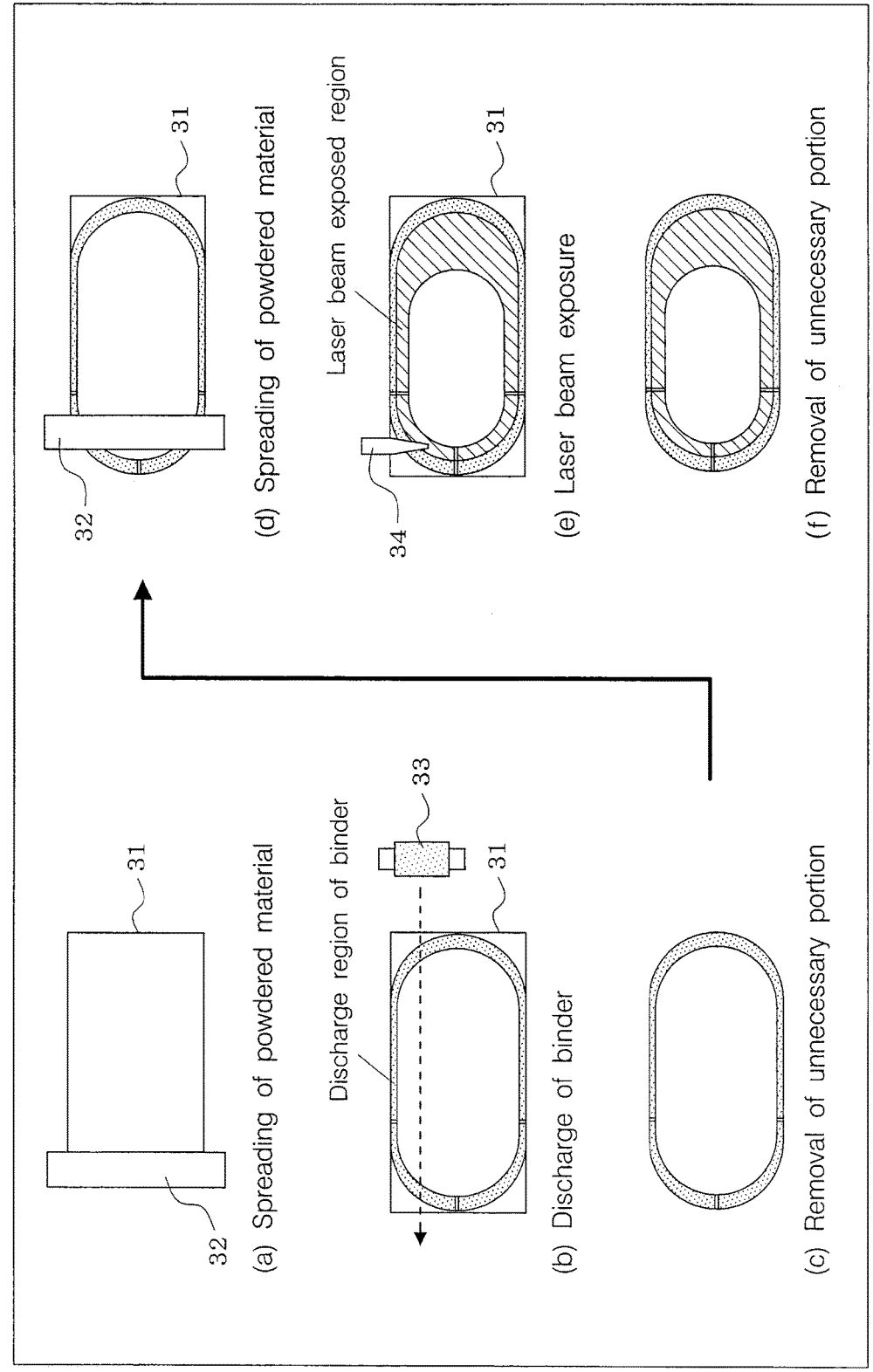

ELECTRONIC DEVICE MANUFACTURING DEVICE AND MANUFACTURING METHOD THEREOF

TECHNICAL FIELD

The present invention relates to an electronic device manufacturing device and manufacturing method thereof which manufactures three-dimensional electronic devices by layering multiple layer cross sections sliced at a predetermined thickness of a three-dimensional electronic device which is the target for forming.

BACKGROUND ART

In recent years, as disclosed in patent literature 1 (Japanese Unexamined Patent Application Publication Number Heisei 11-274671), there are items for forming circuit elements such as wiring patterns, coils, capacitors, resistors and active elements onto boards by jetting one of materials such as conductive material, insulating material, dielectric material, or resistor body material onto a board using an inkjet method.

CITATION LIST

Patent Literature

Patent Literature 1: Japanese Unexamined Patent Application Publication Number Heisei 11-274671

SUMMARY OF INVENTION

Problem to be Solved by the Invention

However, when forming three-dimensional electronic devices using an inkjet method, it is necessary to manufacture a three-dimensional electronic device by layering multiple layer cross sections sliced at a predetermined thickness of a three-dimensional electronic device. In this case, in order to manufacture the three-dimensional electronic device by repeating a process in which, for each printing of a layer cross section which is performed, the work is transferred to a furnace and baked and then the work is returned to the printing device after baking and then printing is performed of the next layer cross section, the work must be positioned for each printing of each layer cross section. Also, depending on the type of material used for printing, baking shrinkage and thermal expansion occur for each baking and the shape changes, so it is necessary to perform correction with respect to the shape change due to baking for each layer printed. Further, if work is baked many times, the work is heated and cooled repeatedly many times, and by the repeated thermal expansion/shrinkage of the work, it is possible for cracks (fissures) or peeling and so on to occur on the work, which causes the defect occurrence rate to increase.

Means for Solving the Problem

In order to solve the above problem, the present invention is an electronic device manufacturing device and manufacturing method thereof which manufactures three-dimensional electronic devices by layering multiple layer cross sections sliced at a predetermined thickness of a three-dimensional electronic device which is the target for forming, comprising: a cross section forming means (cross section forming process) for forming each layer cross section using multiple types of materials by layering on top of the layer cross section underneath; and a solidifying means (solidifying process) which, each time a layer cross section is formed by the cross section forming means (cross section forming process), cures or sinters the cross section by exposing the cross section to one of ultraviolet light, a laser beam, visible light, or an electron beam.

If, as in the present invention, each layer cross section is formed using multiple types of materials by layering on top of the layer cross section underneath, and each time each layer cross section is formed, the cross section is cured or sintered by being exposed to one of ultraviolet light, a laser beam, visible light, or an electron beam, it is possible to perform forming and solidifying (curing or sintering) of each layer cross section in the same position without transferring the work, and positioning of the work does not have to be performed many times, only once will suffice. Also, because the cross sections are solidified by being exposed to one of ultraviolet light, a laser beam, visible light, or an electron beam, when solidifying, the work only needs to be exposed to light energy and so on locally, and it is possible to minimize the deformation of the work during solidification, such that correction with respect to deformation during solidifying can be made unnecessary or minimized. Further, the thermal expansion/shrinkage of the work for each layer can be minimized, so it is less likely for cracks (fissures) or peeling and so on to occur on the work, and the defect occurrence rate can be reduced.

In this case, for the forming method for each layer cross section, it is acceptable to form by forming the cross section by discharging liquid materials via a droplet discharge method such as by inkjet printing or dispensing, or to spread powered material in a layer and discharge a binder via a droplet discharge method to bond that powdered material in that discharge region. Alternatively, it is acceptable to form by spreading powered material in a layer and exposing it to a laser beam to sinter that exposed region of the powdered material. Also, it is acceptable to form a three-dimensional electronic device using only one type of forming method, and it is acceptable to divide manufacturing methods based on the types of materials used.

For the multiple types of materials used for forming, it is acceptable to use one of conductive material, insulating material, dielectric material, resistor body material, and semiconductor material. For example, for sections which form wiring patterns and the electrodes of capacitors, it is acceptable to use conductive material; for sections which form insulating layers, it is acceptable to use insulating material; for sections which form a dielectric layer of a capacitor, it is acceptable to use dielectric material; and for sections which form a resistor body, it is acceptable to use resistor body material.

BRIEF DESCRIPTION OF DRAWINGS

FIG. 1 is a perspective view showing an electronic device formed by the manufacturing method of embodiment 1 of the present invention.

FIG. 2 is a perspective view showing the multiple layer cross sections sliced at a predetermined thickness of an electronic device formed by the manufacturing method of embodiment 1 of the present invention.

FIG. 3(a) to (d) are process diagrams to describe the manufacturing method of embodiment 1.

FIG. 4(a) to (f) are process diagrams to describe the manufacturing method of embodiment 2.

DESCRIPTION OF EMBODIMENTS

The following describes two modes for carrying out the invention, embodiment 1 and embodiment 2.

Embodiment 1

This describes embodiment 1 of the present invention based on FIG. 1 to FIG. 3. Three-dimensional electronic device 11 formed by the manufacturing method of embodiment 1, as with for example a computer mouse and so on, is a solid body made up of a plastic section (insulating section) and a metal section (conductive section), and is formed by layering multiple layer cross sections 12 of the electronic device 11 sliced at a predetermined thickness on circuit board 13.

For embodiment 1, a forming method for electronic device 11 using inkjet printer 14 is described using FIG. 3.

Items such as inkjet head 15 for jetting conductive material, inkjet head 16 for jetting insulating material, inkjet head 17 for jetting resistor body material, inkjet head 18 for jetting dielectric material, and inkjet head 19 for jetting semiconductor material are loaded on inkjet printer 14. Also, loaded on this inkjet printer 14 are items such as ultraviolet light source 21, visible light source 22, and a laser beam source (not shown in the figure) for curing or baking by exposing the printed section each time each layer is printed to light energy such as ultraviolet light or visible light. Data for the multiple layer cross sections sliced at a predetermined thickness of three-dimensional electronic device 11 which is the target for forming is downloaded from an item such as a server (not shown in the figure) and saved in the memory device (not shown in the figure) of inkjet printer 14.

When forming electronic device 11, first, circuit board 13 is brought into inkjet printer 14 and then the circuit board 13 is positioned at a predetermined printing position and clamped by a clamp device (not shown in figure).

After that, data for the first layer cross section saved in the memory device of inkjet printer 14 is read, and inkjet heads 15 to 19 operate based on this cross section data to print the first layer cross section 12 by discharging one of conductive material, insulating material, dielectric material, resistor body material, or semiconductor material onto circuit board 13. For the conductive material it is acceptable to use, for example, ink containing metal nanoparticles; for the insulating material it is acceptable to use, for example, ultraviolet curable resin; for the resistor body material it is acceptable to use, for example, resin containing conductive filler; for the dielectric material it is acceptable to use, for example, ferroelectric particles (such as barium titanate); and for the semiconductor material it is acceptable to use, for example, an organic semiconductor and so on. For example, for sections which form wiring patterns and the electrodes of capacitors, it is acceptable to use conductive material; for sections which form insulating layers, it is acceptable to use insulating material; for sections which form a dielectric layer of a capacitor, it is acceptable to use dielectric material; and for sections which form a resistor body, it is acceptable to use resistor body material.

After that, the appropriate light source for curing/baking the printed material is selected from ultraviolet light source 21, visible light source 22, and the laser beam source and so on, and the printed section is cured or baked by being exposed to light energy. For example, the section printed with ultraviolet curable resin is cured by being exposed to ultraviolet light from ultraviolet light source 21. Also, for the sections printed from the conductive material and resistor body material and so on, the printed sections are baked by being heated locally by being exposed to high energy visible light or laser beams from visible light source 22 or the laser beam source. By this, forming of the first layer cross section 12 is completed.

After that, data for the second layer cross section saved in the memory device of inkjet printer 14 is read and, in the same way as for the first layer, the second layer cross section 12 is printed on top of the first layer cross section 12 and then that printed section is cured or baked. Subsequently, by performing printing and curing/baking of the third layer cross section and on in the same way, three-dimensional electronic device 11 is manufactured by layering multiple layer cross sections 12. By this, items such as wiring, resistors, coils, and capacitors can be formed on the interior and surfaces of three-dimensional electronic device 11. If items such as wiring, resistors, coils, and capacitors must be formed thickly, this can be supported by increasing the number of layers for sections to be formed thickly.

According to embodiment 1 described above, because each layer cross section 12 is printed using multiple types of materials and layered on top of the layer cross section underneath, and each time a layer cross section is formed, the cross section 12 is cured or baked by exposing the cross section 12 to ultraviolet light, laser beam, visible light and so on, it is possible to perform printing and curing/baking of each layer cross section 12 at the same position without transferring the work, and positioning of the work does not have to be performed many times, only once will suffice. Also, because cross sections 12 are cured/baked by being exposed to light energy such as ultraviolet light, a laser beam, or visible light when curing/baking, the work only needs to be exposed to light energy locally, and it is possible to minimize the deformation of the work during curing/baking, such that correction with respect to deformation during curing/baking can be made unnecessary or minimized, and along with only needing to position the work once as given above, productivity can be improved. Further, the thermal expansion/shrinkage of the work for each layer can be minimized, so it is less likely for cracks (fissures) or peeling and so on to occur on the work, and the defect occurrence rate can be reduced.

Although in embodiment 1 each layer cross section 12 is printed using inkjet printer 14, it is acceptable to draw each layer cross section 12 using a droplet discharge method other than inkjet printing (for example dispensing and so on), and of course it is acceptable to switch between inkjet printing and a droplet discharge method other than that based on the types of materials used and the line width (degree of fineness) of the printed pattern.

Embodiment 2

In embodiment 1, each layer cross section 12 was drawn by a droplet discharge method such as inkjet printing, but in embodiment 2 of the present invention shown in FIG. 4, forming is performed by powdered material being spread in a layer and a binder being discharged via a droplet discharge method to bond that powdered material in that discharge region, or forming is performed by powdered material being spread in a layer and it being exposed to a laser beam to sinter that exposed region of the powdered material.

The manufacturing method of embodiment 2 is described below. First, as shown in FIG. 4(a), powdered material (for example, insulating powder such as gypsum) is housed in plate-shaped container 31 and spread in a layer by squeegee 32. After that, as shown in FIG. 4(b), a binder is discharged from inkjet head 33 (or a dispenser) based on the cross section data of the material to bond the material in that discharge region and form the cross section of the material. After that, as shown in FIG. 4(c), after removing the unnecessary portion of the material which was not bonded with the binder, as shown in FIG. 4(d), the next powdered material (for example, powdered metal material) is spread in a layer by squeegee 32. After that, as shown in FIG. 4(e), after the cross section of the material is formed by a laser beam being emitted from laser beam source 34 based on the cross section data of the material to sinter the region of the material exposed to the laser beam, as shown in FIG. 4(f), the unnecessary portion of the material which was not sintered is removed.

Three-dimensional electronic devices are manufactured by layering multiple layer cross sections by repeating the processing in which: forming processing using a binder or laser beam as described above is performed for each type of material included in one layer cross section, and after one layer cross section is formed, the next layer cross section is formed on that cross section.

In embodiment 2 described above also, the same effects as the above embodiment 1 can be obtained. For the present invention, it is also acceptable to have an embodiment which combines the forming methods of embodiment 1 and embodiment 2 based on the types of materials used for forming.

In addition, it goes without saying various embodiments with changes that do not extend beyond the scope of the invention are possible for the present invention, such as that it is not limited to an electronic device with a construction as shown in FIG. 1, embodiments can be applied to various constructions of electronic devices, and it is also not limited to structures of multiple materials, embodiments can be applied in cases in which one circuit element is formed as well.

REFERENCE NUMBER LIST

11: Electronic device
12: Cross section
13: Circuit board
14: Inkjet printer
15 to 19: Inkjet head
21: Ultraviolet light source
22: Visible light source
33: Inkjet head
34: Laser beam source

The invention claimed is:

1. An electronic device manufacturing device for manufacturing a three-dimensional electronic device, comprising:
a plurality of material application units, each of the plurality of material application units hold a different one of multiple types of materials and being configured to apply the different one of the multiple types of materials;
at least two light energy sources positioned next to one another, each of the at least two light energy sources configured to emit a different one of ultraviolet light, a laser beam, visible light, or an electron beam; and
a controller programmed to:
operate the plurality of material application units to form each layer cross section of multiple layer cross sections using multiple types of materials by disposing the multiple types of materials on top of another layer cross section, and
each time a layer cross section is formed, operate the at least two light energy sources to cure or sinter the multiple types of materials, which have not been cured or sintered, of the layer cross section by exposing the layer cross section to at least two of the ultraviolet light, the laser beam, the visible light, and the electron beam.

2. The electronic device manufacturing device according to claim 1, wherein each of the plurality of application units holds a different liquid material and is configured to apply the different liquid material.

3. The electronic device manufacturing device according to claim 1, wherein
the plurality of material application units includes a plate-shaped container and a droplet discharger, and
the electronic device manufacturing device further includes a squeegee.

4. The electronic device manufacturing device according to claim 1 wherein the plurality of material application units are inkjet heads.

5. The electronic device manufacturing device according to claim 1, wherein the multiple types of materials include at least two of conductive material, insulating material, dielectric material, resistor body material, and semiconductor material.

6. An electronic device manufacturing method for manufacturing a three-dimensional electronic device, comprising:
forming each layer cross section of multiple layer cross sections using multiple types of materials by disposing the multiple types of materials on top of another layer cross section, at least one of the multiple layer cross sections forming an electronic component; and
each time a layer cross section is formed, curing or sintering the multiple types of materials, which have not been cured or sintered, of the layer cross section by exposing the layer cross section to at least two of ultraviolet light, a laser beam, visible light, and an electron beam,
wherein the multiple types of materials include at least two of ink containing metal nanoparticles, an ultraviolet curable resin, a resin containing conductive filler, ferroelectric particles, and an organic semiconductor.

7. The electronic device manufacturing method according to claim 6, wherein the multiple types of materials are liquid materials.

8. The electronic device manufacturing method according to claim 6, wherein the multiple types of materials include at least two of conductive material, insulating material, dielectric material, resistor body material, and semiconductor material.

9. The electronic device manufacturing method according to claim 6, wherein each time the layer cross section is formed, curing or sintering the multiple types of materials, which have not been cured or sintered, of the layer cross section by exposing the layer cross section to at least two of ultraviolet light, a laser beam, visible light, and an electron beam includes exposing the layer cross section to at least three of ultraviolet light, a laser beam, visible light, and an electron beam.

10. The electronic device manufacturing method according to claim 6, wherein the multiple types of materials include at least three of ink containing metal nanoparticles, an ultraviolet curable resin, a resin containing conductive filler, ferroelectric particles, and an organic semiconductor.

11. The electronic device manufacturing method according to claim 6, wherein the multiple types of materials include at least four of ink containing metal nanoparticles, an ultraviolet curable resin, a resin containing conductive filler, ferroelectric particles, and an organic semiconductor.

12. The electronic device manufacturing method according to claim 6, wherein the multiple types of materials include ink containing metal nanoparticles, an ultraviolet curable resin, a resin containing conductive filler, ferroelectric particles, and an organic semiconductor.

13. The electronic device manufacturing method according to claim 6, wherein the electronic component is formed by a plurality of the multiple layer cross section.

14. The electronic device manufacturing method according to claim 6, wherein the electronic component includes at least one of a wiring, a resistor, a capacitor, and a coil.

15. The electronic device manufacturing method according to claim 6, wherein the electronic component includes a wiring, a resistor, a capacitor, and a coil.

* * * * *